United States Patent
Ikeda et al.

(10) Patent No.: US 7,047,102 B2
(45) Date of Patent: May 16, 2006

(54) METHOD AND APPARATUS FOR GENERATING DATA FOR MACHINING

(75) Inventors: Mitsuru Ikeda, Atsugi (JP); Masahiro Nakatsuji, Atsugi (JP); Kenji Kawada, Atsugi (JP); Fusao Shibata, Fujieda (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 10/776,253

(22) Filed: Feb. 12, 2004

(65) Prior Publication Data

US 2004/0210337 A1    Oct. 21, 2004

(30) Foreign Application Priority Data

Apr. 21, 2003    (JP)    ............................. 2003-116386

(51) Int. Cl.
*G06F 19/00* (2006.01)

(52) U.S. Cl. ...................................... 700/172; 700/173

(58) Field of Classification Search ................ 700/182, 700/180, 173, 172, 160
See application file for complete search history.

(56) References Cited

U.S. PATENT DOCUMENTS

| | | | | |
|---|---|---|---|---|
| 4,580,207 A | * | 4/1986 | Arai et al. .................. | 700/169 |
| 5,317,518 A | * | 5/1994 | Fujita et al. ................ | 700/184 |
| 5,663,886 A | * | 9/1997 | Lueck ........................ | 700/180 |
| 6,266,572 B1 | * | 7/2001 | Yamazaki et al. ............ | 700/96 |
| 2003/0125829 A1 | * | 7/2003 | Kakino et al. ............... | 700/188 |

OTHER PUBLICATIONS

Iwata, Shinji, "Module to estimate cutting resisting power", Die and Mould Technology Conference of the Japanese Society of Die and Mould Technology 2001, Jun. 24, 2001, pp. 200-201.
Choi, Byoung K., "Sculptured Surface Machining Theory and Applications", Kluwer Academic Publishers, Jan. 1999, Chapter 7.

* cited by examiner

*Primary Examiner*—Leo Picard
*Assistant Examiner*—Ryan A. Jarrett
(74) *Attorney, Agent, or Firm*—Staas & Halsey LLP

(57) ABSTRACT

An object of this invention is to generate NC (Numerical Control) data to improve efficiency of machining. This invention comprises the steps of: generating NC data to machine a first portion of an object, wherein the first portion is specified based on a supposed cutting load distribution of the object; and generating NC data to machine the object after the first portion of the object was machined. Thus, at least two-phase machining data is generated which is separated based on high or low of the supposed cutting load, for example. That is, a tool machine processes the object stepwise. Therefore, it becomes possible that a portion is machined in advance, that it is determined that it is better to machine beforehand based on the supposed cutting load distribution, and the object after the machining is separately machined.

21 Claims, 6 Drawing Sheets

METHOD AND APPARATUS FOR GENERATING DATA FOR MACHINING

TECHNICAL FIELD OF THE INVENTION

This invention relates to information processing technology to generate data for a tool machine.

BACKGROUND OF THE INVENTION

When cutting an object such as a metal mold by a Numerical Control (NC) tool machine, it is necessary to generate data for the NC tool machine (hereafter, called "NC data"). The NC data includes path data of roughing tool, for example, and a Computer Aided Manufacturing (CAM) software is ordinarily used for the generation of the NC data. For example, a user in charge of the generation of the NC data selects any roughing type based on his or her own experience from some roughing types (e.g. contour parallel offset roughing, holing, plane stepping, pencil cut, and etc. As for the details, see Byoung K. Choi et al., Sculptured Surface Machining: Theory and Applications, Chapter 7, KLUWER ACADEMIC PUBLISHERS, January 1999, ISBN: 0412780208) that are supported by the CAM software. Then, the CAM software carries out a tool path calculation processing based on the roughing type selected by the user to generate the NC data.

Incidentally, technology to estimate a load to the tool in the machining is disclosed, for example, in Shinji Iwata, Hideki Aoyama "Module to estimate cutting resisting power", lecture papers of Die and Mold engineer conference 2001, Die and Mold technology committee, Jun. 24, 2001, p200–201.

However, when roughing the metal mold, for example, there are a lot of cases where the cutting load is not flat, and it is difficult to achieve the effective machining by the aforementioned conventional methods. Namely, when the roughing for the whole metal mold is carried out by only the specific roughing type selected by the user, unless the form of the metal mold after the machining is a simple form such as a cube, the load is concentrated to the tool when machining a specific portion of the metal mold. Then, when the object including such a portion that causes the high load is machined, it is necessary to slow down the feed rate in order to prevent damage and vibration of the tool, and the time necessary to machine the metal mold becomes increased as a whole.

SUMMARY OF THE INVENTION

Therefore, an object of this invention is to provide NC data generation technology to improve the machining efficiency.

An NC data generation method for machining according to this invention comprises the steps of: generating NC data to machine a first portion of an object, wherein the first portion is specified based on a supposed cutting load distribution of the object; and generating data to machine the object after the first portion of the object was machined.

Thus, NC data composed of two machining phases at least is generated, which is separated based on high or low of the supposed cutting load. That is, a tool machine processes the object stepwise. Therefore, it becomes possible that a portion is machined in advance, that it is determined that it is better to machine beforehand based on the supposed cutting load distribution, and the object after the machining is separately machined. Incidentally, the cutting load means a load given to the tool at machining the object, and for example, it is represented by an amount of chop or torque.

In addition, the aforementioned first generating step may comprise the steps of: generating NC data of the supposed cutting load distribution of the object, and presenting the data to a user; and accepting an input to specify the first portion from the user, and storing data of the first portion into a storage device.

By this configuration, the user can refer to simulation data of the cutting load, and designate a portion, which seemingly had better be machined beforehand.

Furthermore, the aforementioned first generating step may comprise the steps of: generating NC data having the supposed cutting load distribution of the object; and specifying a portion whose supposed cutting load is higher than a predetermined reference, as the first portion, and storing NC data of the first portion into a storage device.

By this configuration, it is possible to automatically specify the portion whose supposed cutting load is higher than the predetermined reference, which seemingly had better be machined beforehand.

Furthermore, the first portion may be a portion whose cutting load is supposed to be high compared with other portion of the object except the first portion. By this configuration, it is possible to plan to machine a portion whose cutting load is supposed to be relatively high, in advance.

In addition, the aforementioned second generating step may comprises a step of generating data to machine the object after machining the first portion based on an object form after machining the first portion. Thus, it is possible to specify the object form after machining the first portion and to generate NC data to further machine the object in a manner suitable for the object after the machining.

Moreover, the NC data to machine the object after machining the first portion may include data having higher feed rate than the feed rate set when generating the NC data of the supposed cutting load distribution of the object.

Thus, in a case where the object after the specific portion was machined in advance is further machined, NC data having higher feed rate may be generated compared with the feed rate when machining the whole object without machining the specific portion beforehand. Therefore, the machining efficiency is improved.

Furthermore, the NC data to machine the first portion may be NC data for holing. Thus, by the holing such as drilling, helical milling and the like, the specific portion may be machined beforehand. That is, a portion is machined in advance by the holing, at which the large load is given to the tool by the contour parallel offset roughing or plane stepping.

Moreover, the NC data to machine the first portion and the NC data to machine the object after machining the first portion may be NC data for roughing. This is because machining the object stepwise causes no problem, if it is roughing.

Furthermore, the aforementioned first generating step may include a step of, in a case where the first portion includes a plurality of highly loaded points, specifying a machining method for the plurality of highly loaded points based on a distance between the plurality of highly loaded points. By this configuration, it is possible to specify an appropriate machining method for the portion which it is determined that it is better to machine beforehand, based on the distance.

In addition, in a case where the distance between the plurality of highly loaded points is shorter than a predetermined distance, the aforementioned machining method may be a machining method to machine the plurality of highly loaded points together. That is, in a case where there are plural highly loaded points, and they are neighboring each other, a machining method enabling the plural highly loaded points to be machined once, such as slotting, is adopted.

Furthermore, in a case where the distance between the plurality of highly loaded points is equal to or longer than a predetermined distance, the aforementioned machining method may be a machining method to individually machine the plurality of highly loaded points. That is, in a case where there are plural highly loaded points, and they are apart from each other, a machining method that is suitable for individually machining the highly loaded points, such as the drilling, helical milling, and the like, is adopted.

Moreover, an NC data generation apparatus for machining according to this invention comprises a first generator to generate NC data to machine a first portion of an object, wherein the first portion is specified based on a supposed cutting load distribution of the object; a second generator to generate NC data to machine the object after the first portion of the object has been machined; and an output device to output the NC data to machine the first portion of the object, and the NC data to machine the object after the first portion of the object has been machined.

Incidentally, a program causing a computer to carry out the aforementioned method is stored in a storage medium or a storage device, for example, a flexible disk, a CD-ROM, a magneto-optical disk, a semiconductor memory, or a hard disk. Besides, there is also a case where the program is distributed as digital signals through a network. Incidentally, intermediate processing data are temporarily stored in a storage device of the computer, such as a main memory.

DETAILED DESCRIPTION OF THE PREFERRED EMBODIMENTS

Figure 1:
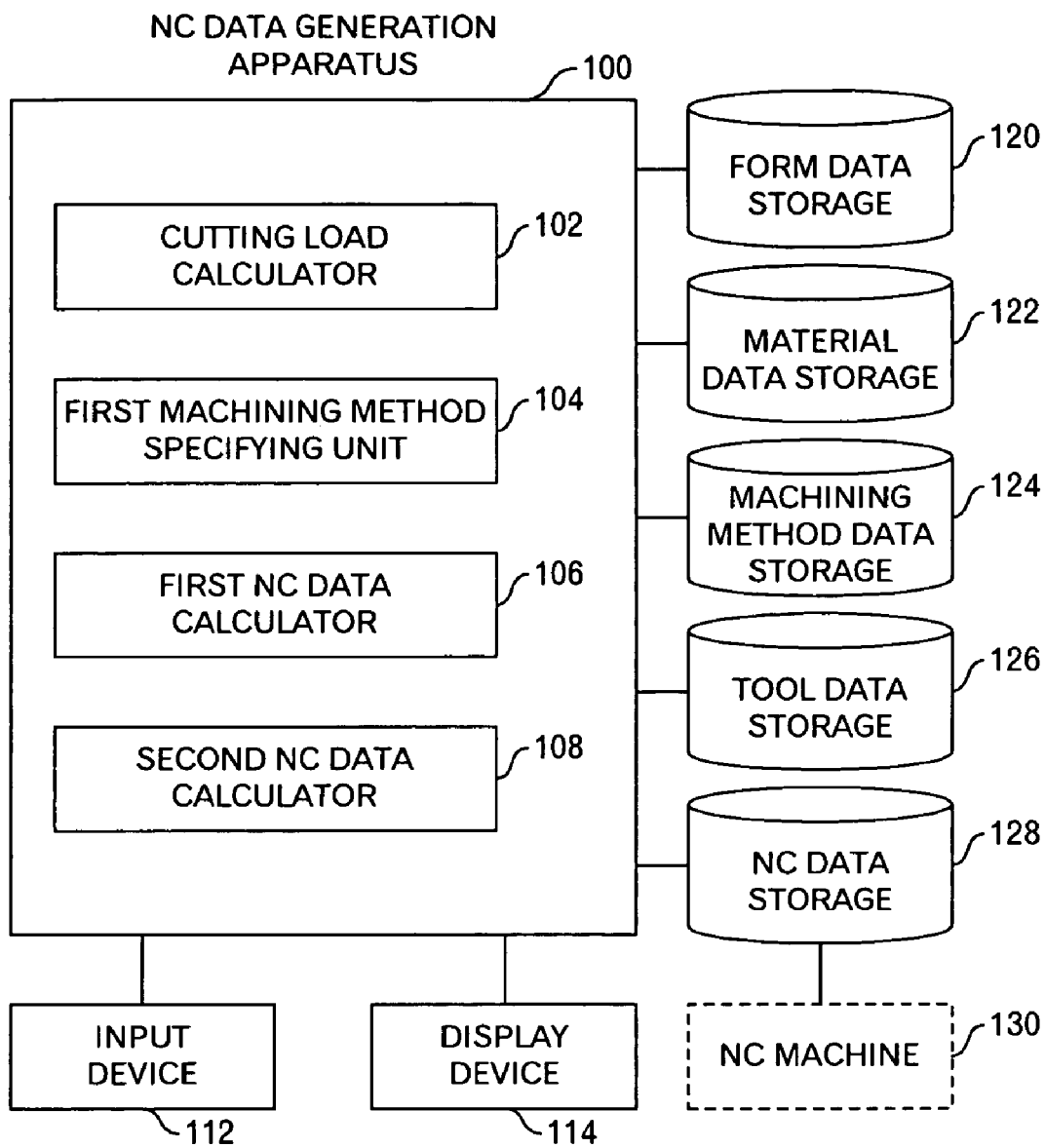
FIG. 1 is a functional block diagram in an embodiment of this invention.

FIG. 1 shows a functional block diagram of an NC data generation apparatus 100 according to one embodiment of this invention. The NC data generation apparatus 100 is a computer such as a personal computer, workstation, or the like, and includes a central processing unit, memory, file storage, and the like (not shown). In addition, the NC data generation apparatus 100 includes a cutting load calculator 102, first machining method specifying unit 104, first NC data calculator 106, and second NC data calculator 108.

These processing contents will be described in an explanation of the following processing flow.

Then, the NC data generation apparatus 100 is connected to an input device 112 such as a mouse, keyboard, and the like, display device 114, form data storage 120, material data storage 122, machining method data storage 124, tool data storage 126, and NC data storage 128. In addition, the NC data storage 128 is connected with an NC machine 130.

In the form data storage 120, data representing a form after the machining, such as Computer Aided Design (CAD) data and the like is stored. In the material data storage 122, data concerning materials to be machined is stored. In the machining method data storage 124, data concerning roughing types such as a contour parallel offset roughing, holing, plane-stepping, pencil cut and the like is stored. In the tool data storage 126, data concerning cutting tools such as types of cutting tools is stored.

In addition, in the NC data storage 128, NC data generated by the first NC data calculator 106 and second NC data calculator 108 of the NC data generation apparatus 100 is stored. Incidentally, the NC data stored in the NC data storage 128 is the data to be referenced by the NC machine 130, and the NC data generated by the first NC data calculator 106 and second NC data calculator 108 may be directly output to the NC machine 130, not temporarily stored in the NC data storage 128.

Next, a processing flow of the NC data generation apparatus 100 shown in FIG. 1 will be explained. First, the cutting load calculator 102 of the NC data generation apparatus 100 accepts selection inputs as to form data before and after the machining (for instance, CAD data), material data, machining method data, and tool data according to operations by a user who is in charge of the NC data generation, and temporarily stores the accepted data into a storage device (step S1).

For example, data stored in the form data storage 120, material data storage 122, machining method data storage 124, and tool data storage 126 is displayed on the display device 114, and the selection inputs are accepted via the input device 112.

Figure 3:
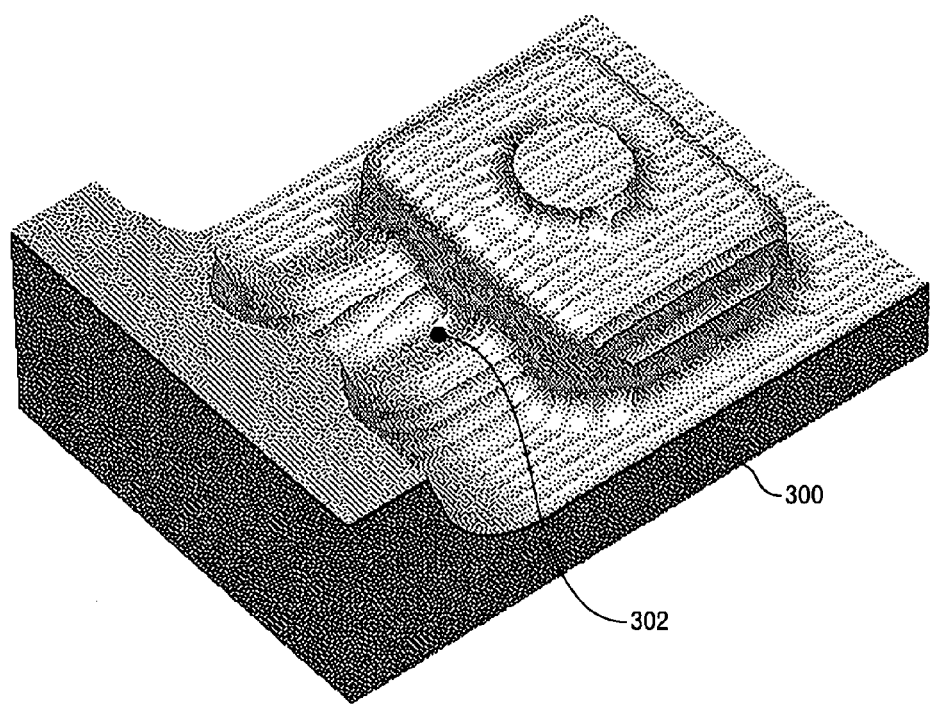
FIG. 3 is a drawing showing an example of a form represented by CAD data.

FIG. 3 shows an example of a form represented by the form data. FIG. 3 shows a metal mold form 300 that is a product form with a finishing allowance, and a highly loaded point 302. Here, the metal mold form 300 is a form to be made by roughing. The highly loaded point 302 will be explained later. The form data may be configured by a combination of data concerning a final product form and data concerning a finishing allowance.

Figure 2:
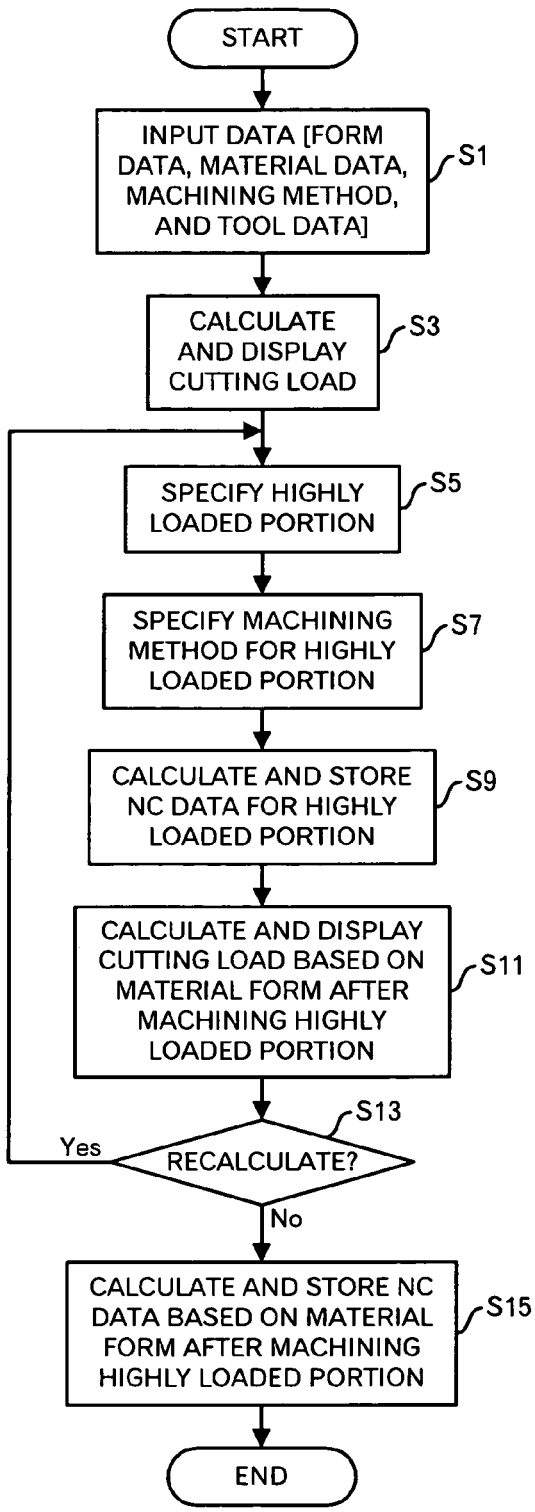
FIG. 2 is a drawing showing a main processing flow in the embodiment of this invention.

Returning to the processing flow in FIG. 2, the cutting load calculator 102 calculates the cutting load that is the load to a tool, at a cutting work based on the accepted data by a machining simulation, and displays the calculation result on the display device 114 (step S3). As for the calculation method of the cutting load, the aforementioned conventional art (explained in the column of the background art) is used. That is, an area of chip section, and depth of cut are calculated, and based on the area of chip section and depth of cut, the cutting load is calculated. Incidentally, if the cutting load can be calculated, it is possible to set the cutting speed suitable for the cutting load. For example, when the cutting speed is set to be slow, the machining time becomes long. Therefore, in a case where the cutting load is concentrated to a specific portion, the machining time period becomes long, and the whole machining time also becomes long.

Figure 4:
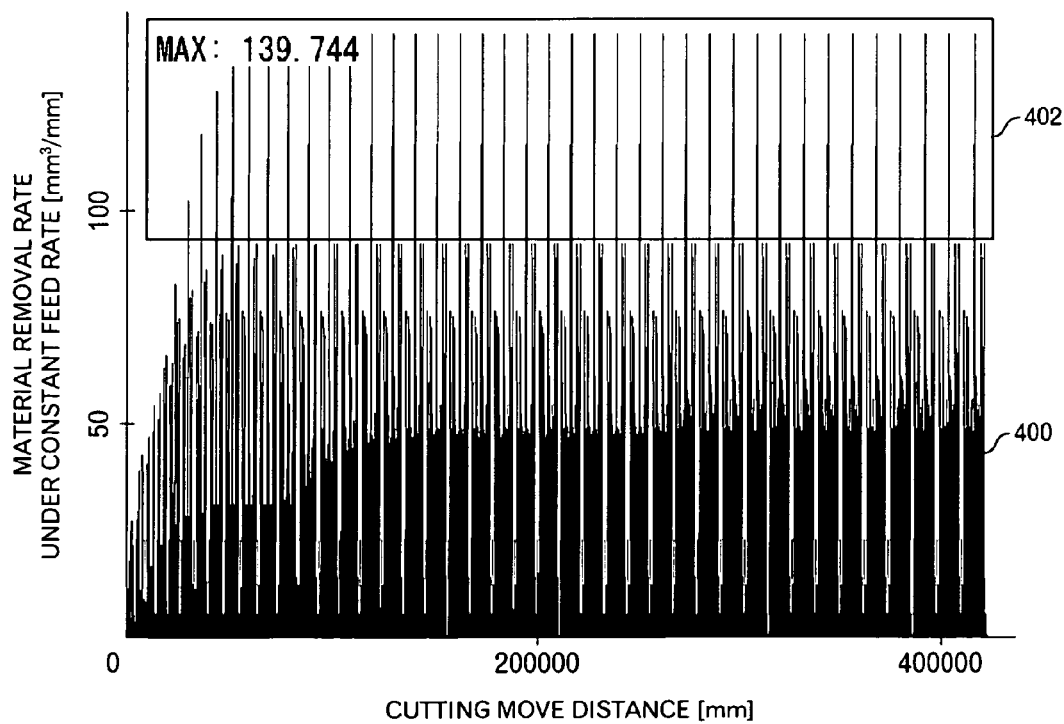
FIG. 4 is a drawing showing an example of a load simulation screen.

FIG. 4 shows an example of a first load simulation screen obtained as the calculation result of the cutting load. FIG. 4 shows an example of the load simulation screen in a case where the form as shown in FIG. 3 is roughly machined, and shows a load curve 400 and highly loaded region 402. The vertical axis represents a material removal rate ($mm^3/mm$) under the condition of constant feed rate, and the horizontal axis represents a cutting move distance of the tool (mm). That is, the load curve 400 represents the load by the material removal rate corresponding to positions of the tool when cutting the object along with the tool path set in advance. Incidentally, the vertical axis is not limited to the material removal rate, and it may be other value representing the cutting load (e.g. torque).

The load curve 400 includes repeated similar curve portions. This is because in cutting, the object is repeatedly cut per one layer among the plural layers of the object. Namely, in this embodiment, because a similar amount of cutting load is calculated for cuttings at the same position when the object is viewed as a plane, the similar curve portions are repeatedly displayed. In addition, in this simulation, because the cutting load is calculated after the cutting tool path was set, the tool position can be detected from the cutting move distance.

Then, the highly loaded region 402 includes a region in which the cutting load is relatively high, and the maximum material removal rate. In this embodiment, the highly loaded region 402 is automatically detected based on a predetermined reference as to the material removal rate. However, because the purpose is to specify the pertinent data, a frame as shown in FIG. 4 may not be shown. In addition, a configuration in which the user can designate the highly loaded region 402 may be adopted. Incidentally, two peaks are included in the highly loaded region 402, and these two peaks indicate neighboring two points. These two points are shown as the highly loaded point 302 in FIG. 3.

Here, an example of a form at which the cutting load becomes high as shown at the highly loaded point 302 (FIG. 3) and the reason why the cutting load becomes high when the work piece is machined to such a form will be explained using FIG. 5.

Figure 5:
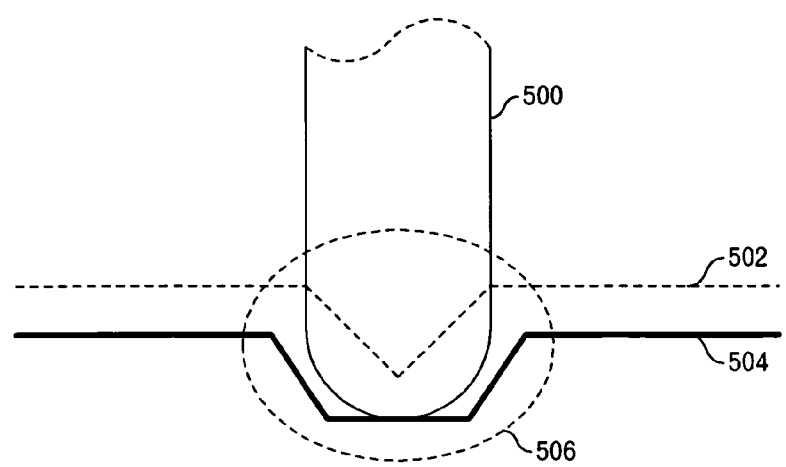
FIG. 5 is a conceptual drawing of cutting.

FIG. 5 shows a conceptual diagram of cutting. FIG. 5 shows a cross section including a tool 500, preform surface 502, product form surface 504, and a highly loaded form 506 on the cross section. The tool 500 cuts the preform surface 502 to form the product form surface 504. At that time, by the contour parallel offset roughing or plane-stepping, the cutting load is small enough for portions that are flatly machined as shown in both edges of FIG. 5. However, the cutting load is large for a concave portion as shown at the highly loaded form 506. This is because at the machining, a contact area of the tool 500 and preform surface 502 increases greatly. That is, the highly loaded point 302 (FIG. 3) is the portion as shown at the highly loaded form 506, and at such a portion, wide area is cut simultaneously. Therefore, the cutting load becomes high.

Returning to the processing flow in FIG. 2, the first machining method specifying unit 104 of the NC data generation apparatus 100 specifies the highly loaded portion based on the aforementioned processing result of the cutting load calculator 102 (step S5). That is, by using the result of the load simulation shown in FIG. 4, positions included in the highly loaded region 402 (FIG. 4) are specified. For example, the highly loaded point 302 shown in FIG. 3 is specified.

Then, the first machining method specifying unit 104 specifies a machining method for the highly loaded point 302 (FIG. 3) (step S7). For example, in a case where the cross section of the highly loaded point 302 (FIG. 3) is a form as shown at the highly loaded form 506 in FIG. 5, a machining method categorized into holing such as the helical milling and the like is specified. It is possible to automatically set to the helical milling or drilling, or to make the user select the machining method.

In a case where the automatic setting is carried out, for example, when plural highly loaded points are adjacent (interval is shorter than a predetermined distance), the helical milling is set, and when one highly loaded point exists or plural highly loaded points are not adjacent (interval is equal to or longer than a predetermined distance (e.g. a length for which it is said to be appropriate to machine by the helical milling)), the drilling is set. In this embodiment, because it is grasped based on the load curve included in the highly loaded region 402 of FIG. 4 that the highly loaded point 302 (FIG. 3) includes two adjacent highly loaded points, the helical milling is set.

Then, the first NC data calculator 106 of the NC data generation apparatus 100 calculates NC data for the highly loaded portion, and stores it into the NC data storage 128 (step S9). That is, the NC data to machine the highly loaded portion specified at the step S5 by the machining method specified at the step S7, is generated. For example, the NC data to machine the highly loaded point 302 (FIG. 3) by the helical milling is generated. Incidentally, because the NC data generation function is an ordinary function in the CAM software, the explanation is omitted. The generated NC data includes data necessary for the NC machining by the NC machine 130, such as tool data, material data, tool path data, cutting speed data, and the like.

Figure 6:
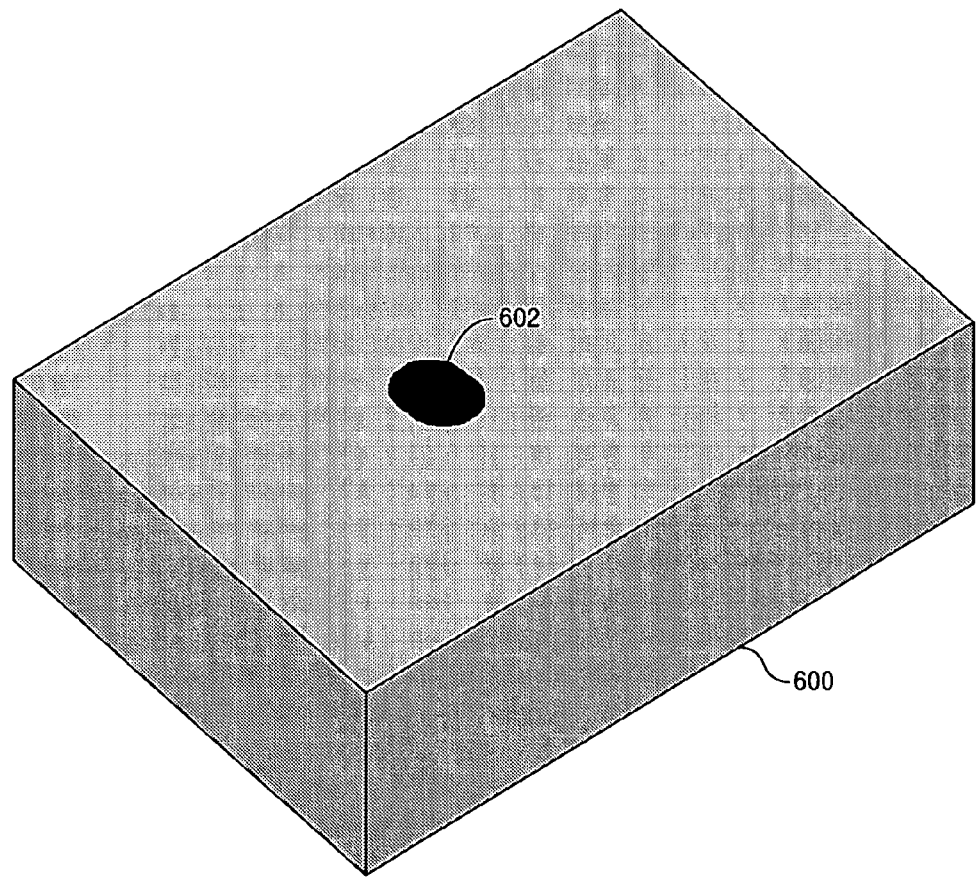
FIG. 6 is a drawing showing a second example of the form represented by CAD data.

FIG. 6 shows an example of an object form after the machining was carried out based on the NC data generated at the step S9 (FIG. 2). FIG. 6 shows an object form 600, and the object form includes a machined portion 602. The machined portion 602 is a portion corresponding to the highly loaded point 302 (FIG. 3), and it is a hole made by the helical milling as described above.

Returning to the processing flow in FIG. 2, the cutting load calculator 102 of the NC data generation apparatus 100 calculates the cutting load by the machining simulation based on the material form after machining the highly loaded portion (step S11). For example, the cutting load when the machined object form as shown in FIG. 6 is further cut to the form as shown in FIG. 3, is calculated.

Figure 7:
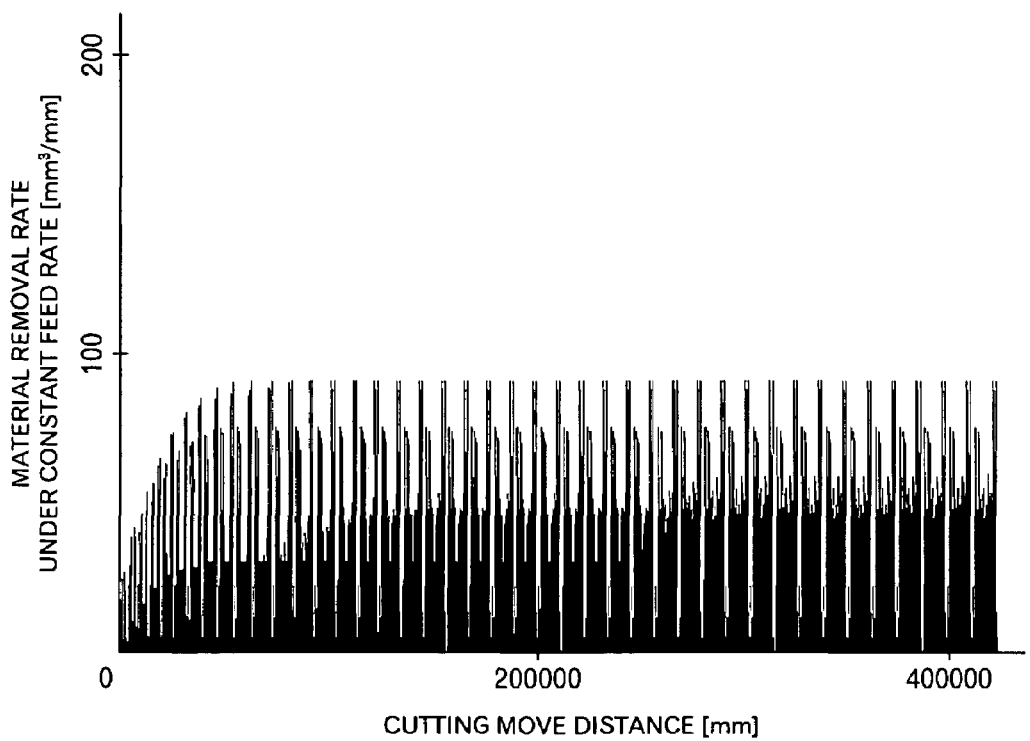
FIG. 7 is a drawing showing a second example of the load simulation screen.

FIG. 7 shows an example of a second load simulation screen shown as the calculation result of the cutting load. FIG. 7 shows a load curve as well as FIG. 4. However, because the form data after machining the highly loaded portion (e.g. highly loaded point 302 (FIG. 3)) is used, no region having high cutting load as included in the highly loaded region 402 (FIG. 4) is found in FIG. 7. That is, compared with the example of FIG. 4, it is understood that the peaks are entirely lowered.

Returning to the processing flow in FIG. 2, the cutting load calculator 102 of the NC data generation apparatus 100 judges whether or not a re-calculation instruction is accepted from the user (step S13). For example, on the screen of FIG. 7, when material removal rate is designated as a new reference by the user, or when the highly loaded region is designated on the graph and a re-calculation button (not shown) is clicked, the cutting load calculator 102 accepts the re-calculation instruction. The user looks at the screen as shown in FIG. 7, and when he or she would like to reduce the cutting load more beforehand, he or she instructs the re-calculation.

If it is judged that any re-calculation instruction is not carried out (step S13: No route), the second NC data calculator 108 of the NC data generation apparatus 100 calculates NC data based on the material form after machining the highly loaded portion, and stores it into the NC data storage 128 (step S15). For example, the NC data is calculated, which is used to cut the machined object form as shown in FIG. 6 to the form as shown in FIG. 3. Because this NC data is calculated based on the object form whose portion, which is supposed to cause the high cutting load by the machining simulation, has been already been cut, the cutting load becomes relatively low compared with a case where an object to which no machining is carried out yet, such as a rectangular parallelepiped, is directly machined, and thus the cutting speed may be increased. For example, the cutting speed is set to a value according to a reciprocal of a reduction ratio of the cutting load. Therefore, it is possible to shorten the machining time. Incidentally, as for other machining conditions such as the tool data, other than the form of the object before the machining, they are identical with the conditions at the machining simulation.

On the other hand, in a case where it is judged that the re-calculation instruction is carried out (step S13: Yes route), the processing returns to the step S5. That is, the first machining method specifying unit 104 specifies the highly loaded portion based on the new condition designated on the screen in FIG. 7 again. Here, the highly loaded portions are further specified in addition to the highly loaded portion designated on the screen in FIG. 4, or a region to specify the highly loaded portion is expanded. Then, the processing at the steps S7 to S11 is carried out again as well as described above.

Figure 8:
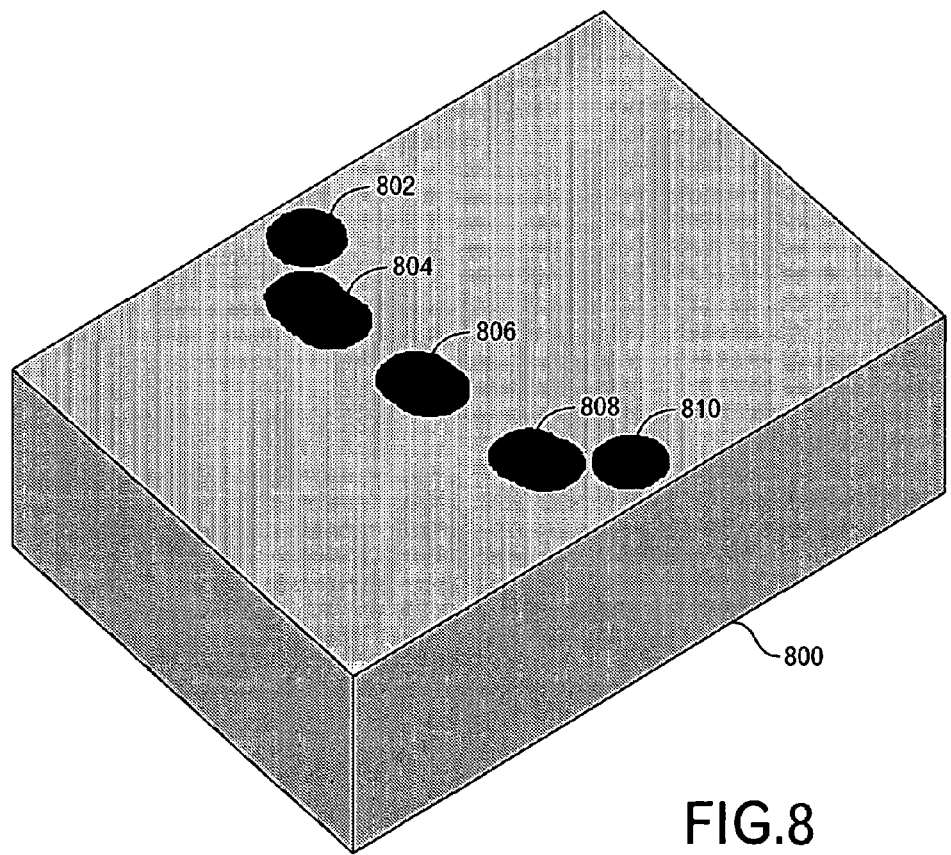
FIG. 8 is a drawing showing a third example of the form represented by CAD data.

FIG. 8 shows an example of an object form when the machining was carried out based on the NC data generated by carrying out the step S9 (FIG. 2) again. FIG. 8 shows an object form 800, and the object form 800 includes a first machined portion 802, second machined portion 804, third machined portion 806, fourth machined portion 808, and fifth machined portion 810. The third machined portion 806 corresponds to the machined portion 602 in FIG. 6. Then, when comparing the object form 600 with the object form 800, it is understood that the machined portions are increased. The machined portions 804, 806, and 808 are holes made by the helical milling, for example, as well as the machined portion 602 (FIG. 6). That is to say, these machined portions are helically milled portions for the plural points that are adjacent within a predetermined distance in a case where a condition in which material removal rate is equal to or more than, for example, 50 (mm³/mm) under the condition of constant feed rate, is designated as a threshold value for highly loaded points on FIG. 7, for instance. On the other hand, because the machined portions 802 and 810 are apart from other highly loaded points more than the predetermined distance, these are holes made by drilling.

Incidentally, when machining to a long and narrow hole like the second machined portion 804, the slotting may be carried out. In addition, plural adjacent portions such as the first machined portion 802 and second machined portion 804 may be machined together by the slotting. Thus, in order to reduce the cutting load greatly, it is necessary to carry out the holing for more portions beforehand.

Figure 9:
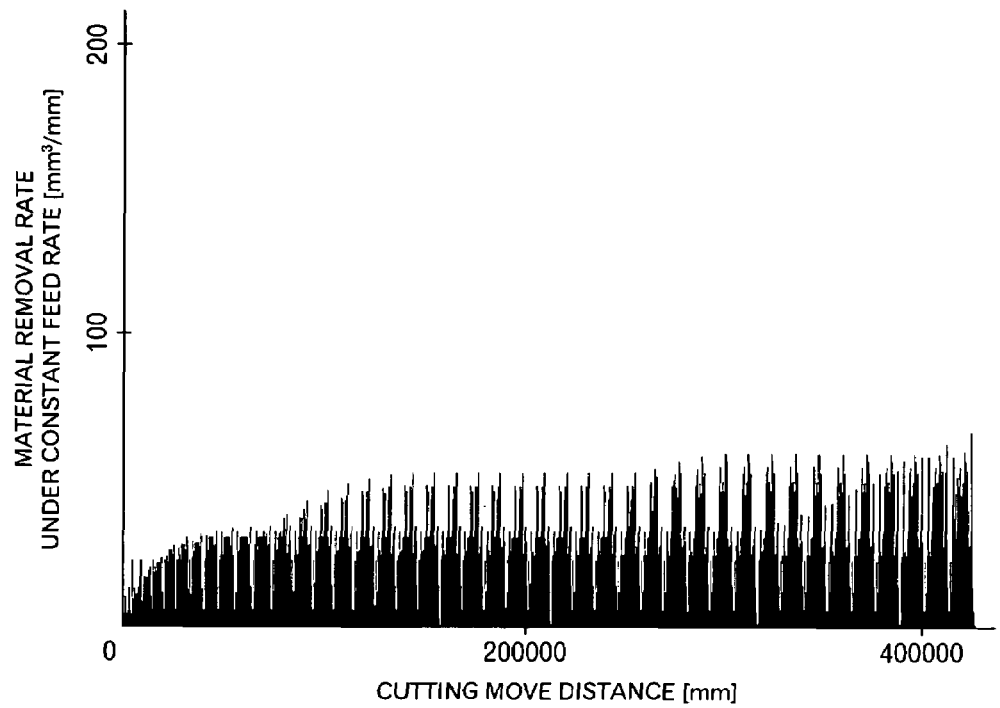
FIG. 9 is a drawing showing a third example of the load simulation screen.

FIG. 9 shows an example of a third load simulation screen as the calculation result of the cutting load. FIG. 9 shows a load curve as well as FIGS. 4 and 7. However, because the cutting load when machining the machined object form as shown in FIG. 8 to the form shown in FIG. 3 is calculated, it is understood that the peaks are entirely lowered. That is, compared with FIGS. 4 and 7, because the cutting load is lowered, the machining speed can be increased. The user can instruct the re-calculation until he or she is satisfied while looking at such a screen.

Thus, by carrying out the simulation of the cutting load, and separating a machining step for a portion whose cutting load is supposed to be high from machining steps for other portions, the NC data enabling the cutting load to be entirely reduced is generated. By this configuration, compared with a case where the machining is carried out without separating the machining steps, the machining speed can be increased.

Figure 10:
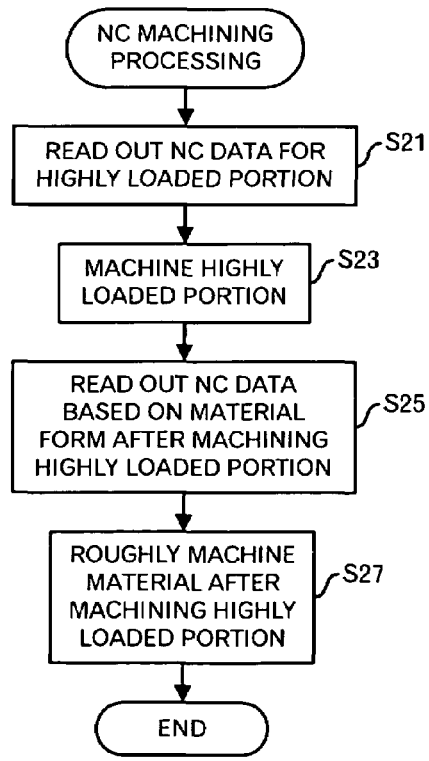
FIG. 10 is a drawing showing a second processing flow of NC machining in this embodiment of this invention.

Next, a processing flow of the NC machine 130 shown in FIG. 1 will be explained using FIG. 10. First, the NC machine 130 reads out the NC data for the highly loaded portions among data stored in the NC data storage 128 (step S21). The NC data for the highly loaded portion means data stored at the step S9 (FIG. 2).

Then, the NC machine 130 carries out the machining for the highly loaded portions according to the read NC data (step S23). For example, the machining to make holes beforehand by the helical milling is carried out.

Then, the NC machine 130 reads out the NC data based on the material form after machining the highly loaded portions among the NC data stored in the NC data storage 128 (step S25). The NC data read here is NC data stored at the step S15 (FIG. 2). Incidentally, NC data may be read out and stored into a memory together at the step S21. Then, the NC machine 130 carries out the roughing for the material after machining the highly loaded portions according to the NC data read out at the step S25 (step S27).

Thus, according to the NC data generated by the NC data generation apparatus 100, the machining is carried out stepwise.

Though one embodiment of this invention was explained above, this invention is not limited to this embodiment. For example, the functional blocks of the NC data generation apparatus 100 shown in FIG. 1 are mere examples, and do not always correspond to actual program modules. In addition, the screen examples shown in FIGS. 4, 7 and 9 are mere examples, and the same data may be represented in other manners. For example, a screen in which a position is directly indicated so that the user can easily recognize the highly loaded portion may be configured.

In addition, the NC data generation apparatus 100 maybe configured by one computer or plural computers. Similarly, the input device 112, display device 114, and NC machine 130 may be respectively configured as plural devices. Incidentally, though an example for the metal mold machining is shown in the embodiment described above, the technology of this invention can be applied to the machining for any other objects, not limiting to the metal mold.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-implemented method for generating NC data for machining, comprising:

generating NC data to machine a first portion of an object, said first portion specified based on a simulated cutting load distribution of said object; and generating NC data to machine said object after said first portion of said object was machined.

2. The computer-implemented method as set forth in claim 1, wherein said first generating comprises:

generating NC data of said simulated cutting load distribution of said object, and presenting said data to a user; and accepting an input to specify said first portion from said user, and storing NC data of said first portion into a storage device.

3. The computer-implemented method as set forth in claim 1, wherein said first generating comprises:
generating data of said simulated cutting load distribution of said object; and
specifying a portion at which said simulated cutting load is higher than a predetermined reference, as said first portion, and storing NC data of said first portion into a storage device.

4. The computer-implemented method as set forth in claim 1, wherein said first portion is a portion at which a tool load is simulated to be high compared with a portion of said object except said first portion.

5. The computer-implemented method as set forth in claim 1, wherein said second generating comprises generating NC data to machine said object after machining said first portion based on an object form after machining said first portion.

6. The computer-implemented method as set forth in claim 1, wherein said NC data to machine said object after machining said first portion includes NC data having higher feed rate than feed rare set when generating NC data of said simulated cutting load distribution of said object.

7. The computer-implemented method as set forth in claim 1, wherein said NC data to machine said first portion is NC data for holing.

8. The computer-implemented method as set forth in claim 1, wherein said NC data to machine said first portion and said NC data to machine said object after machining said first portion are NC data for roughing.

9. The computer-implemented method as set forth in claim 1, wherein said first generating comprises, in a case where said first portion includes a plurality of highly loaded points, specifying a machining method for said plurality of highly loaded points based on a distance between said plurality of highly loaded points.

10. The computer-implemented method as set forth in claim 9, wherein, in a case where a distance between said plurality of highly loaded points is shorter than a predetermined distance, said machining method is a machining method to machine said plurality of highly loaded points together.

11. The computer-implemented method as set forth in claim 9, wherein, in a case where a distance between said plurality of highly loaded points is equal to or longer than a predetermined distance, said machining method is a machining method to individually machine said plurality of highly loaded points.

12. A program embodied on a medium for causing a computer to generate NC data for machining, said program comprising:
generating NC data to machine a first portion of an object, said first portion specified based on a simulated cutting load distribution of said object; and
generating NC data to machine said object after said first portion of said object was machined.

13. The program as set forth in claim 12, wherein said first generating comprises:
generating data of said simulated cutting load distribution of said object, and presenting said data to a user; and accepting an input to specify said first portion from said user, storing data of said first portion into a storage device.

14. The program as set forth in claim 12, wherein said first generating comprises:
generating NC data of said simulated cutting load distribution of said object; and
specifying a portion at which said simulated cutting load is higher than a predetermined reference, as said first portion, and storing NC data of said first portion into a storage device.

15. The program as set forth in claim 12, wherein said data to machine said object after machining said first portion includes NC data having higher feed rate than feed rate set when generating NC data of said simulated cutting load distribution of said object.

16. The program as set forth in claim 12, wherein said first generating comprises, in a case where said first portion includes a plurality of highly loaded points, specifying a machining method for said plurality of highly loaded points based on a distance between said plurality of highly loaded points.

17. An NC data generation apparatus for machining, comprising:
a first generator to generate NC data to machine a first portion of an object, said first portion specified based on a simulated cutting load distribution of said object;
a second generator to generate NC data to machine said object after said first portion of said object was machined; and
an output device to output said NC data to machine said first portion of said object, and said NC data to machine said object after said first portion of said object was machined.

18. The NC data generation apparatus as set forth in claim 17, wherein said first generator comprises:
a generator to generate NC data of said simulated cutting load distribution of said object, and presenting said NC data to a user; and
an input receiver to accept an input to specify said first portion from said user, and to store data of said first portion into a storage device.

19. The NC data generation apparatus as set forth in claim 17, wherein said first generator comprises:
a generator to generate NC data of said simulated cutting load distribution of said object; and
a specifying unit to specify a portion at which said simulated cutting load is higher than a predetermined reference, as said first portion, and to store NC data of said first portion into a storage device.

20. The NC data generation apparatus as set forth in claim 17, wherein said data to machine said object after machining said first portion includes NC data having higher feed rate than feed rate set when generating NC data of said simulated cutting load distribution of said object.

21. The NC data generation apparatus as set forth in claim 17, wherein said first generator comprises a specifying unit, which, in a case where said first portion includes a plurality of highly loaded points, specifies a machining method for said plurality of highly loaded points based on a distance between said plurality of highly loaded points.

* * * * *